United States Patent Office 2,763,620
Patented Sept. 18, 1956

2,763,620

PROCESS FOR PREPARING ALUMINA SOLS

John Bugosh, Wilmington, Del., assignor to E. I. du Pont de Nemours and Company, Wilmington, Del., a corporation of Delaware No Drawing. Application December 5, 1951,
Serial No. 260,090

15 Claims. (Cl. 252—313)

This invention relates to processes for the preparation of stable aqueous dispersions of colloidal, amorphous, hydrated alumina wherein an aluminate is reacted with an acidic component in an aqueous reaction medium.

More particularly, the invention relates to such processes in which the reaction of an aluminate with an acidic component is effected in the presence of such an excess of the acidic component that during the reaction the pH is below about 5.5 substantially all the time and at the end of the reaction the pH is above 3.5. Also, according to the invention, at least ½ of the aluminum content of the alumina in the aqueous mass at the completion of the reaction is provided by aluminate which is added while the pH of the reacting mass is within the range of about 3.5 to 5.5. Vigorous agitation is provided in the reacting mass at least at the point of initial contact of the reactants. Water is employed in the processes in amount required to provide that the concentration of the aluminum-containing constituent in the aqueous dispersion is, at the completion of the reaction, not above about 5% by weight calculated on an $Al_2O_3$ basis.

The aluminate used in the processes of the invention is a water soluble aluminate salt of a base having a basic (hydroxyl) dissociation constant greater than about 0.1. The acidic component is a monobasic acid having a dissociation constant greater than about 0.1, an aluminum salt of such an acid, or mixtures of such acid with such aluminum salt.

Various techniques can be used for bringing together the acidic and aluminate reactants in accordance with the pH and concentration requirements of the processes of the invention. For example, the processes of the invention can be practiced batchwise by first charging the acidic reactant into a reaction vessel, preferably in aqueous solution, and then feeding the aluminate reactant in aqueous solution into the body of acidic component whereby the pH of the reacting mass gradually increases. The aluminate feed is then continued until at least ½ of the aluminum content of the alumina formed in the reacting mass has been provided by aluminate which is added while the mass has a pH in the range of 3.5 to 5.5 and the aluminate feed is terminated before the pH of the reacting mass exceeds about 5.5. Water is added to the reaction vessel as required so that the aluminum-containing constituent is present in the aqueous dispersion at the termination of the aluminate addition in concentration not in excess of about 5% by weight of the dispersion, calculated as $Al_2O_3$. In practicing the batchwise operation, best results are obtained if the reacting mass is kept at about 60-100° C. thruout the process.

Alternatively, the acidic and aluminate reactants can be added simultaneously to a reaction vessel containing water, or to a portion of an aqueous dispersion of colloidal, amorphous, hydrated alumina previously prepared, the rates of addition of the acidic component and the aluminate being proportioned relative to each other so as to maintain the pH of the liquid mass in the vessel from 3.5 to 5.5 and, preferably, from 3.5 to 4.5, substantially thruout the reaction period. The amount of water used in the process is adjusted so as to give as a product an aqueous dispersion containing the aluminum-containing constituent in amount corresponding to not more than 5% by weight, calculated as $Al_2O_3$.

According to still another technique, the acidic and aluminate reactants and water can be brought together in a pipe-line reactor in proportions to give a resulting aqueous dispersion having a pH of 3.5-5.5 and, preferably, 3.5-4.5, and an aluminum concentration of not more than about 5% by weight, calculated as $Al_2O_3$.

In carrying out processes of the invention according to either of the last two preferred alternatives, no matter whether the acidic component is an acid, an aluminum salt of such acid, or mixtures of an aluminum salt and an acid, at least ½ of the aluminum content of the aqueous dispersion formed is provided by the aluminate reactant. Suitable products are obtained according to these embodiments by maintaining the temperature of the reacting mass at about 20° C. to 100° C. thruout the reaction cycle.

It will be seen from the foregoing that regardless of the particular technique used for bringing together the reactants and water, the important thing in practicing the processes of the invention is to proportion these materials so as to obtain as a result an aqueous dispersion having a pH of 3.5-5.5 and, preferably, 3.5-4.5, to provide agitation at least at the point of initial contact of the reactants, to assure that at least ½ of the aluminum content of the alumina in the aqueous mass at the completion of the reaction is provided by aluminate which is added while the pH of the reacting mass is within the range of about 3.5 to 5.5, and to have a concentration of aluminum-containing constituent at the completion of the reaction equivalent to not more than about 5% by weight, calculated as $Al_2O_3$. The water needed to give the required concentration of the aluminum-containing constituent in the product can be added separately or along with either or both of the reactants. For practical reasons, it is undesirable to dilute the product to concentrations less than about 0.25% by weight $Al_2O_3$ basis.

As mentioned previously, the reactants are brought together under conditions that provide for intimate mixing. This avoids local excesses of the aluminate reactant that raise the pH above about 5.5. This can be done by providing vigorous agitation at the point of initial contact of the reagents with each other. If the mixing is done in a tank-like vessel, any of the conventional high speed stirrers can be used. Alternatively, the reactants can be brought together in a high speed centrifugal pump to provide vigorous agitation, or in a pipe line carrying liquid in turbulent flow.

The reactants are advantageously first prepared in aqueous solution before bringing them together to effect a reaction in order to make the job of rapid intimate mixing easier. Preferably, the aluminate reactant is used as an aqueous solution containing 0.25 to 25% by weight of the aluminate and the acid is employed in aqueous solution having a normality substantially equal to that of the aluminate solution. Still more preferably, the reagents are used in 0.04 to 2.5 normal aqueous solutions.

The correct proportioning of the acidic component and aluminate reactants to give an aqueous dispersion product having a pH of 3.5-5.5 is easily achieved, for example, by continuously or frequently recording the pH of the reacting mass. In a batch operation in which the aluminate is added to a body of the acidic component, the aluminate feed is continued even after the pH has increased to 3.5 until at least ½ of the aluminum content of the alumina in the aqueous mass has been provided by the aluminate but is terminated before the pH exceeds about 5.5. If the acidic component used is an aluminum salt such as aluminum chloride, for example, the pH of the starting aqueous solution of the aluminum chloride will ordinarily be about 3.0 and less aluminate will then be needed. If, on the other hand, the acidic component is an acid, the initial pH will be considerably lower and the aluminate first added does, it is believed, react to form an aluminum salt of the acid and the salt will then in turn react with additional aluminate to give the stable aqueous dispersions of colloidal, amorphous, hydrated alumina.

If the operation is conducted by feeding the reagents simultaneously into a reaction zone, the feed rate of one or the other of the reactants is simply increased or decreased as required to keep the pH within the desired range.

In commercial practice, it will normally be preferred to use fixed concentrations of solutions of the reagents in amount and at feed rates that have been predetermined by calculation or test to give the required pH and concentration to the product dispersion. In general, it will be found that the aluminate and acidic reactants are employed in the correct amounts when the atomic ratio of aluminum to free anion used is 0.5:1 to 7.0:1, the term "free anion" meaning the amount of the anion provided by the acidic reactant, in mols, in excess of that stoichiometrically required to form the normal salt with the cation of the aluminate reactant.

As mentioned, the aluminates used in the processes of the invention are water soluble aluminate salts of bases having a basic (hydroxyl ion) dissociation constant greater than 0.1. More preferably, the aluminate is an alkali metal aluminate. Illustrative of suitable aluminates are tetramethyl ammonium aluminate, sodium aluminate, and potassium aluminate. Sodium aluminate is most preferred.

The acidic reactant used in the processes of the invention is selected from the class consisting of a monobasic acid having an acid dissociation constant greater than 0.1, an aluminum salt of such acid, and mixtures thereof. Illustrative of suitable acids are hydrochloric, nitric, trichloroacetic, iodic, and perochloric. Illustrative of aluminum salts are aluminum chloride, aluminum nitrate, and the normal aluminum salts of the other foregoing acids.

The products obtained by the processes of the invention are stable dispersions in water of colloidal, amorphous, hydrated alumina. By "colloidal" I mean that the particles have a size in the range of about 1 to 100 millimicrons. By "amorphous" I mean that the hydrated alumina particles, as initially prepared, do not show an X-ray pattern. Thus, the dispersion shows a strong X-ray pattern only for the salt produced in the reaction; for example, the X-ray pattern for sodium chloride is obtained when sodium aluminate and hydrochloric acid are used as reactants.

The collodial dispersions obtained by the processes of this invention are stable and essentially sediment free. By "stable" I mean that the dispersed alumina remains in the dispersed colloidal state without gelling or precipitating even after being subjected to heating, freezing and thawing, and aging for extended periods at room temperature. For example, a colloidal dispersion produced by the processes of this invention can be aged at room temperature for at least a year without gelling or precipitating. In fact, colloidal dispersions which are slightly turbid when initially prepared usually become even less turbid upon aging at room temperature for a few months.

As further evidence of stability, the colloidal dispersions can be heated to the boiling point for several hours without gelling and if the water evaporated on heating is continuously replaced, the colloidal dispersion will not gel even after heating for several weeks. Also, the colloidal dispersions can be frozen and then melted; for example, a dispersion of the invention containing 1% alumina can be frozen at temperatures at low as −78° C., then thawed, and the melt remains a colloidal dispersion, i. e., there is no precipitate for gelling.

By "esentially sediment free," I mean that the colloidal dispersion obtained as a product has in a dispersed colloidal state at least 95% of its alumina content.

The aqueous colloidal dispersions, or sols, as obtained by the processes of this invention contain hydrated alumina in amount up to 5% by weight $Al_2O_3$ basis and, preferably, from 0.25% to 5% $Al_2O_3$ by weight. Once the sols have been produced, they can be further concentrated by any of the conventional means for removing water such as evaporation, electrodecantation, or desiccation.

The aqueous colloidal dispersions are further characterized, as mentioned before, by having a pH of 3.5 to 5.5 and, preferably, 3.5 to 4.5. Analysis shows that in the dispersions, the atomic ratio of aluminum to free anion is from 0.5 to 7.0 and in preferred compositions from 1.0 to 5.0. By "free anion," I mean the amount of the anion provided by the acidic reactant, in mols, in excess of that stoichiometrically required to form the normal salt with the cation of the aluminate reactant.

A further characteristic of the aqueous colloidal dispersions having a pH in the preferred range of 3.5–4.5 is observed by titrating the dispersions with a base while recording pH. A plot of the volume of base added versus the pH gives a curve having a characteristic inflection at about pH 5–6.

The sols obtained by the processes of the invention are useful in the purification of water and as modifiers for textiles, paper, and fixing dyes. They are also useful as sources of alumina in processes for obtaining various crystalline forms of alumina.

The invention will be better understood by reference to the following examples. In the examples, all "parts" are parts by volume unless otherwise stated.

*Example I*

There was charged into a reactor 300 parts of water which had been adjusted to a pH of 4.30 by addition of a small amount of concentrated hydrochloric acid. The reactor was fitted with a thermometer, an agitator, and two feed lines. The feed lines extended into the reactor below the surface of the acidified water and their exits were in close proximity to the agitator blades.

The agitator was started and a hydrochloric acid solution was fed into the vessel thru one feed line while aqueous sodium aluminate solution was fed thru the other. The concentration of the aqueous hydrochloric acid solution was 0.50 molar and the concentration of the sodium aluminate solution was 0.46 molar. The sodium aluminate used in making the aqueous solution was a proprietary product containing by analysis 57.00% as $Al_2O_3$ and 35.79% as $Na_2O$, which corresponds to a molecular ratio of $Al_2O_3/Na_2O=0.966$, and an $NaAlO_2$ content of 91.6%.

The acid solution was fed into the reactor at the rate of 480 parts per hour, the sodium aluminate solution at the rate of 333 parts per hour. These rates were maintained for three hours, the temperature of the liquid mass in the reactor being kept at about 30° C. thruout, and then addition of the reactants was terminated. Thruout the reaction period, the pH of the liquid mass in the reactor remained at pH 4.0±0.3.

The product obtained by the process of this example was a stable, slightly opalescent sediment free dispersion in water of colloidal hydrated alumina. The dispersion contained 0.86% $Al_2O_3$ by weight and had a pH of 4.40. The product showed no sign of gelling or of precipitating on standing for six months at room temperature.

*Example II*

200 parts of water adjusted to pH 4.50 with hydrochloric acid were charged into a reactor equipped with a thermometer, reflux condenser, agitator, a feed line, and a discharge line. The feed and discharge lines were connected thru an external circulating pump system.

The agitator in the reactor was started, the acidified liquid in the reactor heated to 80° C., and the circulating pump started. An aqueous hydrochloric acid solution and an aqueous sodium aluminate solution were then fed simultaneously by separate lines into the circulating line at a point located just before the intake of the circulating pump.

The sodium aluminate solution used was 0.23 molar, the HCl solution 0.25 molar. The sodium aluminate used in preparing this solution was a proprietary product containing the equivalent of 57.49% $Al_2O_3$ by weight, and 33.16% $Na_2O$ by weight, which corresponds to a molecular ratio of $Al_2O_3/Na_2O$ of 1.05 and an $NaAlO_2$ content of 92.5% by weight.

The feed rate for the sodium aluminate solution was 250 parts per hour and for the HCl solution, the feed rate was 330 parts per hour. The process was so operated for four hours and then terminated. The temperature of the reacting mass was maintained at about 80° C. thruout the reaction period. The pH of the reacting mass remained at 4.5±0.3 thruout.

The product sol was a dispersion in water of colloidal, amorphous, hydrated alumina. It contained the aluminum equivalent of 0.45% by weight calculated as $Al_2O_3$, a pH of 4.2, an aluminum/free chlorine atomic ratio of 3/1, and a specific conductivity of 11,340 micromhos/cm. It was opalescent and did not gel on aging or on heating.

*Example III*

This example illustrates the preparation of an alumina sol by a method similar to that of Examples I and II, except that the preparation is carried out at 95° C.

Using similar starting materials and the same equipment as in Example II, the reaction was run at a constant temperature of 95° C., with the feed rates of acid and aluminate solutions being 1440 parts by volume per hour and 1,000 parts by volume per hour, respectively, and an alumina sol of similar appearance was obtained. The pH of this sol was 4.10, and the concentration of $Al_2O_3$ by weight was 0.86% in the final sol.

Two hundred parts by volume of this sol were purified by adding to this volume of sol an intimate mixture of 100 parts by volume of moist anion exchange resin and 100 parts by volume of cation exchange resin. The mixture of resins was added slowly while agitating the sol. The pH of the sol remained essentially constant at about 4.0 during the removal of the salt. Analysis of the final sol showed that about 80% of the chloride ion had been removed. The final sol was similar in properties to that described in Example II.

*Example IV*

The following is an example of the preparation of an alumina sol of a higher alumina content than that in the previous examples, and with an atomic ratio of Al/free Cl=2.2:1.

Nine hundred and eighty parts by volume of a 1.85 molar sodium aluminate solution like that described in Example II and 1440 parts by volume of a 2.0 molar hydrochloric acid solution were prepared. Three hundred parts by volume of distilled water which had been adjusted to a pH of 4.50 was also prepared. Using the same equipment and techniques described in Example I, the acid and aluminate solutions were fed into the water simultaneously at rates of 473 parts by volume per hour and 327 parts by volume per hour, respectively, while the reaction mixture was kept at a constant temperature of 95° C.

The product of this reaction was a turbid sol with a final pH of 3.75, a specific conductivity of 83,800 micromhos/cm., and an alumina content of 3.45% by weight. This sol was freed of excess salt and acid by dialyzing under static conditions at room temperature for a period of 48 hours, and it was noted that the turbidity of the sol was reduced. The sol did not gel. The pH of the purified sol was 5.57, and its specific conductivity was 775 micromhos/cm.

*Example V*

The following is an example of the preparation of an alumina sol from sodium aluminate and hydrochloric acid, the sol having an atomic ratio of Al/free Cl=1.0:1.

Nine hundred and sixty parts by volume of a 0.93 molar sodium aluminate solution like that described in Example II, and 1,920 parts by volume of a 1.0 molar hydrochloric acid solution were prepared. Three hundred parts by volume of distilled water which had been adjusted to a pH of 5.00, was also prepared. Using the same general equipment and techniques as described in Example I, the acid and aluminate solutions were fed into the water with vigorous agitation at rates of 640 parts by volume per hour and 320 parts by volume per hour, respectively. The temperature was kept at 95° C. throughout the reaction.

The final product was a stable, opalescent alumina sol which had a pH of 3.80 and a specific conductivity of 46,400 micromhos/cm. and contained 1.76% $Al_2O_3$ by weight. This sol did not gel upon standing or after being heated.

This sol was freed of excess salt and acid by dialyzing for two days thru cellophane membranes against distilled water. After dialysis, the pH of the sol was 5.62 and the specific conductivity was 591 micromhos/cm. This sol was very clear, containing no sediment, and it did not gel upon standing or heating.

*Example VI*

The following is an example of the preparation of an alumina sol by the alternate process of adding the calculated amount of sodium aluminate solution to the proper proportion of hydrochloric acid solution to form a stable sol at an Al/free Cl atomic ratio of 2.3:1.

Seven hundred and twenty parts by volume of a 0.50 molar hydrochloric acid solution and 500 parts by volume of a 0.46 molar sodium aluminate solution like that described in Example II were made up. The acid solution was placed into a flask and agitated vigorously. The sodium aluminate solution was then added slowly under the surface of the acid solution at a rate of 7.25 parts by volume per minute. The entire reaction was run at a constant temperature of 80° C. At the end of the reaction, it was found that an opalescent alumina sol showing some initial schlieren effects was obtained. The pH of this sol was 4.88, and the specific conductivity was 26,100 micromhos/cm. This sol did not gel upon standing or even when boiled. After freezing this sol at −78° C. and thawing, it did not gel, and the colloidal particles of alumina were not precipitated.

*Example VII*

100 parts by volume of an 0.75 molar solution of sodium aluminate in water (pH 11.5) was added gradually with vigorous agitation over a twenty-minute period to 125 parts by volume of a 0.25 molar solution of aluminum chloride in water (pH 2.8). The solutions were at approximately room temperature at the start of the reaction and the temperature of the reacting mass gradually increased to a maximum of 62° C. a completion of the sodium aluminate addition. At this point, the pH of the reacting mass was somewhat above the desired maximum of 5.5 and a small amount of 1 N hydrochloric acid was added to lower the pH to 4.2. The resulting product was a slightly turbid alumina sol containing about 2% $Al_2O_3$. The sol was stable showing no signs of breaking after storage for almost two months.

The pH limitations recited thruout the specification and in the following claims are based on readings made using a Beckman Model G pH meter equipped with a glass electrode and a calomel cell.

I claim:

1. In a process for the manufacture of a stable aqueous dispersion of colloidal, amorphous, hydrated alumina, the steps comprising reacting a water soluble aluminate salt of a base having a basic dissociation constant greater than about 0.1 with an acidic component of the group consisting of a monobasic acid having a dissociation constant greater than about 0.1, an aluminum salt of such acid, and mixtures thereof, the reaction being effected by bringing together an aqueous solution of the aluminate and an aqueous solution containing the acid component with agitation at the point of initial contact of said aqueous solutions to form an aqueous reacting mass, the acidic component being present in such excess that the pH of the reacting mass is below about 5.5 throughout the reaction and is above about 3.5 at the completion of the reaction, at least ½ of the aluminum content of the alumina in the aqueous mass at the completion of the reaction being provided by aluminate which is added while the pH of the reacting mass is within the range of about 3.5 to 5.5, and sufficient water being present at the completion of the reaction to provide not more than about 5% by weight, calculated as $Al_2O_3$, of aluminum-containing material in the aqueous dispersion formed in the process.

2. A process of claim 1 in which the aluminate is an alkali metal aluminate.

3. A process of claim 2 in which the acidic component is aluminum chloride.

4. A process of claim 2 in which the acidic component is hydrochloric acid and the alkali metal aluminate is sodium aluminate.

5. A process of claim 4 in which the sodium aluminate reactant is employed in aqueous solution containing from 0.25 to 25% by weight sodium aluminate and the hydrochloric acid is employed in aqueous solution having a normality substantially equivalent to that of said sodium aluminate solution.

6. In a process for the manufacture of a stable aqueous dispersion of colloidal, amorphous, hydrated alumina, the steps comprising reacting a water soluble aluminate salt of a base having a basic dissociation constant greater than about 0.1 with an acidic component of the group consisting of a monobasic acid having a dissociation constant greater than 0.1, an aluminum salt of such acid, and mixtures thereof, the reaction being effected by feeding into a body of aqueous solution of said acidic component an aqueous solution of said aluminate with agitation at the point of initial contact of said aqueous solutions whereby the pH of the reacting mass gradually increases, continuing to feed aluminate into the reacting mass until at least ½ of the aluminum content of the alumina formed in the reacting mass has been provided by aluminate which is added while the mass has a pH of 3.5 to 5.5, terminating the aluminate feed before the pH of the reacting mass exceeds about 5.5 and introducing sufficient water into the reacting mass to provide at the completion of the reaction not more than about 5% by weight, calculated as $Al_2O_3$, of aluminum-containing material in the aqueous dispersion formed in the process, said reaction being carried out at a temperature of about 60° C. to 100° C.

7. A process of claim 6 in which the aluminate is an alkali metal aluminate.

8. A process of claim 7 in which the acidic component is aluminum chloride.

9. A process of claim 7 in which the acidic component is hydrochloric acid and the alkali metal aluminate is sodium aluminate.

10. A process of claim 9 in which the sodium aluminate reactant is employed in aqueous solution containing from 0.25 to 25% by weight sodium aluminate and the hydrochloric acid is employed in aqueous solution having a normality substantially equivalent to that of said sodium aluminate solution.

11. In a process for the manufacture of a stable aqueous dispersion of colloidal, amorphous, hydrated alumina, the steps comprising reacting a water soluble aluminate salt of a base having a basic dissociation constant greater than about 0.1 with an acidic component of the group consisting of a monobasic acid having a dissociation constant greater than 0.1, an aluminum salt of such acid, and mixtures thereof, the reaction being effected by feeding the aluminate and the acidic component simultaneously into an aqueous reaction medium with agitation at the point of initial contact and at such rates relative to each other as to maintain the pH of the resulting reacting mass between about 3.5 and 5.5, the aluminate reactant being introduced in amount to provide at least ½ of the aluminum content of the alumina formed in the reacting mass and sufficient water being introduced into the reacting mass to provide at the completion of the reaction not more than about 5% by weight, calculated as $Al_2O_3$, of aluminum-containing material in the aqueous dispersion formed in the process, said reaction being carried out at a temperature of about 20° C. to 100° C.

12. A process of claim 11 in which the aluminate is an alkali metal aluminate.

13. A process of claim 12 in which the acidic component is aluminum chloride.

14. A process of claim 12 in which the acidic component is hydrochloric acid and the alkali metal aluminate is sodium aluminate.

15. A process of claim 14 in which the sodium aluminate reactant is employed in aqueous solution containing from 0.25 to 25% by weight sodium aluminate, the hydrochloric acid is employed in aqueous solution having a normality substantially equivalent to that of said sodium aluminate solution, and the pH of the aqueous dispersion formed is maintained between pH 3.5 and 4.5 throughout the reaction period.

References Cited in the file of this patent

UNITED STATES PATENTS 2,085,129     Stoewener     June 29, 1937